Patented May 19, 1953

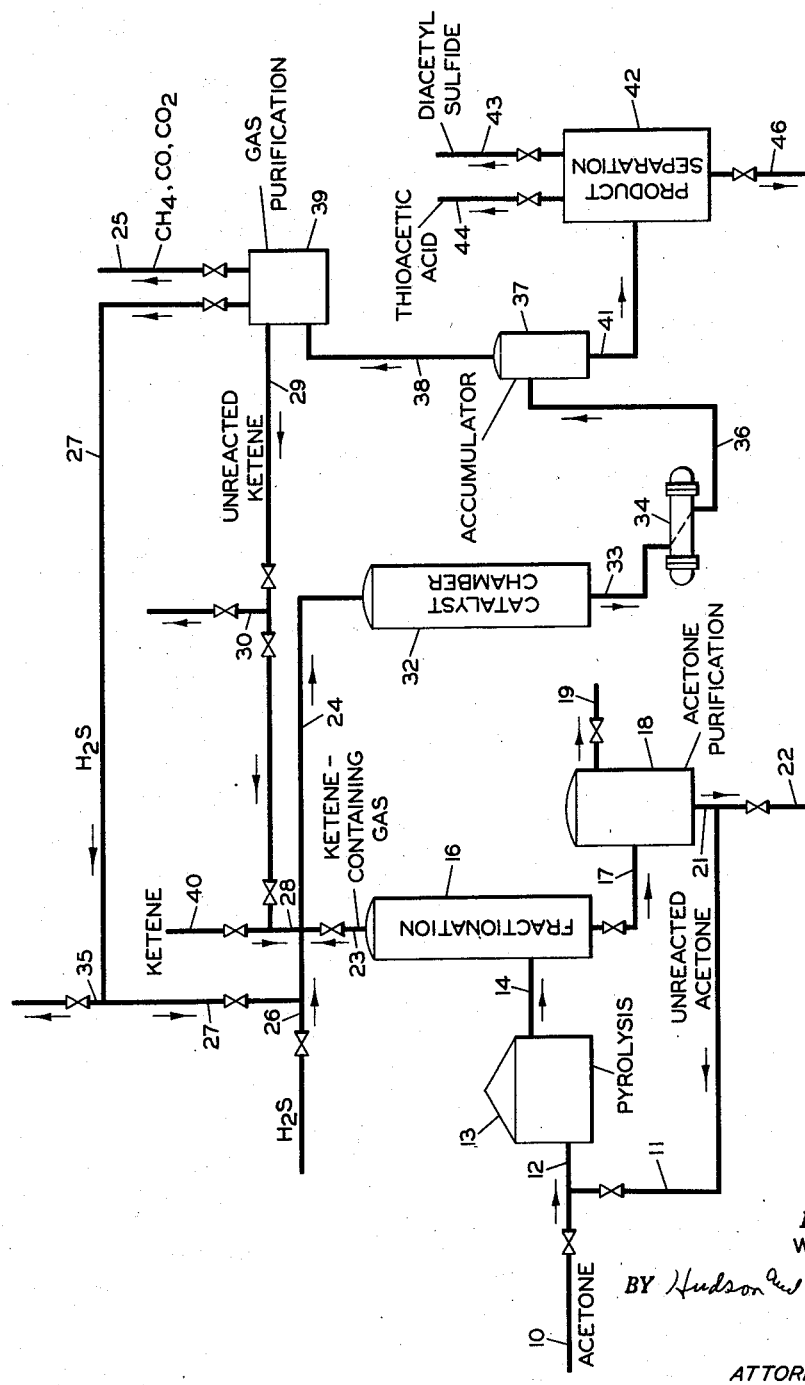

2,639,293

UNITED STATES PATENT OFFICE 2,639,293

MANUFACTURE OF THIOACETIC ACID AND DIACETYL SULFIDE

Willie W. Crouch, Bartlesville, Okla., assignor to Phillips Petroleum Company, a corporation of Delaware Application December 16, 1948, Serial No. 65,622

13 Claims. (Cl. 260—500)

This invention relates to thioacetic acid and diacetyl sulfide. In one aspect this invention relates to the preparation of thioacetic acid and diacetyl sulfide.

Thioacetic acid and diacetyl sulfide have been prepared by various procedures reported in the art, all of which are either expensive or inefficient, or both, as regards their commercial scale application. One recently proposed method for the preparation of thioacetic acid involves the reaction of acetic acid anhydride with hydrogen sulfide, wherein only one of the two acetyl groups of the anhydride can be converted to thioacetic acid for each mole of the acid anhydride that reacts. One reported method for preparing diacetyl sulfide involves the reaction of acetyl chloride with a sulfide of an alkali metal, in which case the cost of the acetyl chloride, as a starting material, in the commercial scale production of low cost diacetyl sulfide, is prohibitive.

This invention is concerned with the ultization of relatively inexpensive raw materials to produce thioacetic acid and diacetyl sulfide, each in high yield and purity.

An object of this invention is to provide a process for the production of thioacetic acid and diacetyl sulfide.

Another object is to provide a process for the interaction of ketene with hydrogen sulfide to produce both thioacetic acid and diacetyl sulfide.

Another object is to provide for the production of thioacetic acid and diacetyl sulfide from ketene and hydrogen sulfide.

Other objects will be apparent to those skilled in the art, from the accompanying discussion and disclosure.

I have now discovered a new and efficient catalytic process for the production of thioacetic acid and diacetyl sulfide, wherein both of these compounds are produced over a broad range of process conditions. In accordance with my invention ketene and hydrogen sulfide are introduced in a mole ratio of hydrogen sulfide to ketene within the range of 0.2:1 to 8:1, into contact with a solid adsorbent contact catalyst maintained at a temperature within the range of 50 to 4000° F., and reacted in vapor phase. Under some conditions both thioacetic acid and diacetyl sulfide are formed in substantial amounts, but, as will be more fully disclosed herein, I have further found that conditions may be so chosen that either one or the other may be produced as a major product.

A particularly important feature of my invention is the use of a solid adsorbent contact catalyst. Attempts to effect vapor phase reaction of ketene with hydrogen sulfide under conditions similar to those of the process of my invention, but with no catalyst being employed, have resulted in no detectable amounts of thioacetic acid or diacetyl sulfide being formed.

Many solid adsorbent contact catalysts may be used as catalysts in the process of my invention. Among the solid adsorbent contact catalysts which I prefer to use, are included synthetic or natural occurring aluminas, catalysts containing alumina such as titania-alumina, zirconia-alumina, chromia-alumina, molybdena-alumina, vanadium pentoxide-alumina, cupric oxide-alumina, thoria-alumina and the like, sulfide catalysts such as molybdenum sulfide, and simple solid adsorbent contact catalysts such as activated charcoal. However, no one of these catalysts is the equivalent of any other, especially insofar as conditions of optimum use, catalyst life, yield per pass of desired product, and the like, are concerned.

Although temperatures within the range of 50 to 400° F. may be employed in the practice of my invention, the preferred range is usually within the limits of from 150 to 350° F. Contact time may generally be chosen within the limits of 0.5 to 10 seconds, although contact times outside that broad range may be utilized. More often, a contact time within the range of 1 to 5 seconds is advantageously employed. Usually, a contact time extended beyond the broad range of 0.5 to 10 seconds is of no significant advantage, although in specific instances higher yields of desired product may be obtained. One of the more important of the reaction conditions employed is the mole ratio of reactants, i. e., moles of hydrogen sulfide per mole of ketene introduced into contact with the catalyst. Although both thioacetic acid and diacetyl sulfide may be formed when introducing hydrogen sulfide and ketene reactants in contact with the catalyst in a mole ratio of hydrogen sulfide to ketene within the broad range of 0.2:1 to 8:1, already discussed, I have found that optimum yields of thioacetic acid are obtained when introducing hydrogen sulfide and ketene in contact with the catalyst in a mole ratio of hydrogen sulfide to ketene within the limits of 2:1 to 5:1, and that optimum yields of diacetyl sulfide are formed when that mole ratio is within the range of 0.2:1 to 2:1.

The ketene used in the practice of my invention may be relatively pure, or may be associated with other materials. Ketene-containing streams comprising from 10 to 100 per cent by weight ketene may be employed. Ketene obtained from the pyrolysis of di-ketene may be used, or impure streams obtained by any of various known pyrolysis methods may be satisfactorily employed. Ketene-containing effluents from the pyrolysis of acetone, the pyrolysis or dehydrogenation of acetaldehyde, the pyrolysis of acetic acid and the pyrolysis of dehydration of acetic anhydride may be employed. Of the various sources of ketene above mentioned, the pyrolysis of acetone has proven to be particularly satisfactory, not only from the standpoint of the ease and efficiency with which acetone may be converted to ketene, but also in view of the low cost of acetone as a raw material.

Ketene is manufactured commercially by the pyrolysis of acetone, perhaps more often than by any other method. This process has been studied extensively by workers in the art, and many references are available as to the effect of reaction variables such as temperature, pressure, residence time, catalysts and materials of construction of the pyrolysis tube. Generally, yields in the range of about 40 to 80 per cent or higher are obtained when acetone is pyrolyzed at temperatures around 1300° F. The most important variable controlling the ultimate yield of ketene is the conversion of acetone per pass; lower per pass conversions give higher ultimate yields. Thus, in selecting the pyrolysis temperature and rate of charge of acetone to a given pyrolysis tube, a compromise is required between, (1) operating to obtain a high ultimate yield of ketene from the acetone consumed, by using relatively low temperatures and short residence times to obtain low conversions per pass, or (2) operating for maximum ketene production from a given pyrolysis apparatus by using higher temperatures and longer residence times to obtain higher conversions per pass at the sacrifice of ultimate yield.

In a preferred embodiment of my invention, ketene is prepared by the pyrolysis of acetone, and the resulting ketene-containing pyrolysis product is passed together with hydrogen sulfide, through a bed of solid adsorbent contact catalyst under conditions suitable for production of thioacetic acid and diacetyl sulfide. Although both the thioacetic acid and the diacetyl sulfide are formed in all instances, reaction conditions, particularly the mole ratio of reactants introduced into contact with the catalyst, may be selected for obtaining one product in optimum yield at the expense of decreased yield of the other.

In order to present my invention more clearly reference is made to the attached drawing which diagrammatically illustrates a preferred embodiment of my invention. It is to be understood that the flow diagram is diagrammatic only and that it may be altered in many respects by those skilled in the art and yet remain within the intended scope of my invention.

Referring to the drawing, acetone from line 10 is introduced through line 12 to pyrolysis zone 13, alone or together with recycled acetone from line 11, discussed hereafter. Pyrolysis zone 13 is maintained usually at atmospheric pressure, and at a temperature in the range of 700 to 1400° F., under which conditions acetone therein is pyrolyzed to form ketene as a chief pyrolysis product. Other pyrolysis products formed in zone 13 are chiefly, carbon monoxide, carbon dioxide, and methane together with lower yields of heavier by-product materials, including some ketene polymer. Total effluent from pyrolysis zone 13 is passed through line 14 to fractionation zone 16 wherein it is separated into light ketene-containing overhead product, and residual product, comprising unreacted acetone and normally liquid pyrolysis by-product. Ketene-containing overhead product separated in zone 16 contains from 10 to as high as 80 to 90 per cent ketene, depending upon the selected pyrolysis conditions. Residual product from fractionation zone 16 is passed through line 17 to acetone purification zone 18 wherein it is separated into normally liquid pyrolysis by-product, and unreacted acetone of desired purity for recycling. Pyrolysis product separated in zone 18 is withdrawn through line 19. Acetone from zone 18 is recycled through lines 21, 11 and 12 to pyrolysis zone 13, or it may be withdrawn from line 21 through line 22, for further utilization, not shown. Overhead product from fractionation zone 16 comprises ketene together with other light pyrolysis product, predominantly methane, carbon monoxide and carbon dioxide. Ketene-containing product from zone 16 is passed through line 23 and admixed in line 24 with hydrogen sulfide introduced through line 26. Any unreacted hydrogen sulfide and/or any unreacted ketene, recovered from the reaction product, may be recycled to line 24, as described hereafter. The resulting ketene-hydrogen sulfide mixture in line 24 is passed into catalyst chamber 32, and contains hydrogen sulfide and ketene in a respective mole ratio within the limits of 0.2:1 to 8:1, dependent upon the relative yields of thioacetic acid and diacetyl sulfide sought; the proper mole ratios for obtaining optimum yields of each product are discussed elsewhere in this specification. Catalyst zone 32 contains a solid adsorbent contact catalyst maintained at a temperature within the range of 50 to 400° F. The selected catalyst may be, any one of the types already discussed, for example, granular alumina. Contact time in catalyst zone 32 is usually within the range of from 0.5 to 10 seconds, although shorter or longer times may be utilized. In most cases ketene is substantially completely reacted, although when introducing hydrogen sulfide in a relatively low mole ratio to ketene, as when predominantly forming diacetyl sulfide, some ketene may be incompletely reacted, depending upon the specific temperature and time conditions selected. Total effluent from catalyst zone 32 is passed through line 33 to condenser 34 wherein normally liquid product is condensed. Total effluent from zone 34, containing both condensate and uncondensed gas is passed through line 36 to accumulator 37 wherein a liquid condensate layer is separated from the uncondensed gas. Uncondensed gas from zone 37 contains predominantly unreacted hydrogen sulfide, any unreacted ketene, carbon monoxide, carbon dioxide and methane, and is passed through line 38 to gas purification zone 39 comprising fractionation equipment, absorption equipment and other facilities well known to those skilled in the art, adaptable to the recovery of hydrogen sulfide and any unreacted ketene from the material introduced through line 38, not individually illustrated. Any unreacted ketene separated in zone 39 may be recycled through lines 29, 28 and 24 to catalyst zone 32. However, if desired, unreacted ketene from zone 39 present in line 29 may be withdrawn through line 30 for utilization elsewhere, not shown. Hydrogen sulfide separated in zone 39 may be recycled through lines 27 and 24 to reaction zone 32, or may be withdrawn from line 27 through line 35 for utilization elsewhere, not shown. Gas residue predominantly methane, carbon monoxide and carbon dioxide, is passed from zone 39 through line 25 for further utilization, not shown.

Liquid product from zone 37 contains thioacetic acid and diacetyl sulfide, and is passed through line 41 to product separation means 42 comprising fractionation equipment, separators, storage facilities and the like, not individually illustrated, suitable for use in recovery of the thioacetic acid and diacetyl sulfide product. From zone 42 is withdrawn thioacetic acid through line 44 and diacetyl sulfide through line 43 as products of the process. Heavy product comprising some ketene polymer, high molecular weight sulfur-containing materials, and the like, is withdrawn from zone 42 through line 46. Ketene from any source other than acetone pyrolysis, may be introduced to catalyst chamber 32 through lines 40 and 24.

Diacetyl sulfide undergoes rapid decomposition at its boiling point at atmospheric pressure, although thioacetic acid can be fractionated quite satisfactorily at ordinary pressures. Accordingly, when recovering product in zone 42, it is advantageous to conduct fractionation of any diacetyl sulfide-containing product under subatmospheric pressure conditions.

For convenience and clarity certain apparatus such as pumps, surge tanks, accumulators, valves, etc. have not been shown in the drawing. Obviously such modifications of the present invention may be practiced without departing from the scope of the invention.

My invention is illustrated by the following examples. The reactants, their proportions, and other specific ingredients are presented as being typical and should not be construed to limit the invention unduly.

Example I

Dry acetone was fed continuously to a pyrolysis furnace at the rate of 3.26 moles per hour. The furnace temperature was maintained at 1330° F. The effluent from the furnace was passed continuously to a fractionation column. The unchanged acetone was removed from the fractionator as bottoms. Analysis showed that the gaseous overhead from the fractionator contained 0.463 mole per hour of ketene comprising about 36 weight per cent of the stream. This stream was continuously mixed with 1.88 moles per hour of dry, gaseous hydrogen sulfide, corresponding to a hydrogen sulfide to ketene mole ratio of 4.06:1. This combined stream was passed through a 250 cc. catalyst chamber filled with one-eighth inch alumina pellets. The temperature was maintained at 212° F. Total effluent from the reactor was in vapor phase and was continuously cooled to condense the desired product, predominantly thioacetic acid. The uncondensed gases were collected for the recovery of unreacted hydrogen sulfide. The crude thioacetic acid product was then purified by distillation. In this way 0.422 mole per hour of thioacetic acid concentrate, boiling at 180 to 197° F., was obtained, representing a yield of 91 per cent of theory. The identity of the thioacetic acid was established by (1) its reaction with aniline at room temperature to form acetanilide and (2) its oxidation with cupric chloride solution to produce diacetyl disulfide. Relatively low yields of diacetyl sulfide were obtained.

Example II

A series of runs was carried out in exactly the same manner and in the same equipment as in Example I except that the catalyst was bauxite pebbles and the temperature was varied as shown in the table below.

| Temperature, °F. | Pounds of Thioacetic Acid Concentrate Per Pound of Ketene |
|---|---|
| 122 | 0.39 |
| 212 | 0.89 |
| 320 | 0.92 |

Example III

A series of runs was carried out under the same conditions and in the same equipment as in Example I except that the catalyst was bauxite pebbles and the hydrogen sulfide to ketene ratio was varied as shown in the table below.

| Mol Ratio Hydrogen Sulfide : Ketene | Pounds of Thioacetic Acid Concentrate Per Pound of Ketene |
|---|---|
| 2.6 | 0.99 |
| 3.9 | 0.82 |
| 6.0 | 0.91 |

Example IV

A series of runs was made under the same conditions and in the same equipment as in Example I except that other catalysts were employed as shown in the following table.

| Catalyst | | | | Catalyst Preparation | Yield of Thioacetic Acid, Percent of Theory |
|---|---|---|---|---|---|
| Major Component | Percent | Minor Component | Percent | | |
| alumina | 80 | titania | 20 | powders of the two oxides mixed together and pilled, calcined | 84 |
| Do | 84 | thorium nitrate | 16 | alumina pills dipped in thorium nitrate solution and dried | 83 |
| Do | 80 | zirconia | 20 | powders of the two oxides mixed together and pilled, calcined | 80 |
| Do | | (1) | | alumina pills dipped in ammonium tungstate and dried, not calcined | 77 |
| Do | 82 | chromia | 18 | alumina pills dipped in chromic acid solution, dried and calcined | 77 |
| Do | 90 | cupric oxide | 10 | alumina impregnated with cupric oxide | 75 |
| Do | 91 | molybdena | 9 | alumina pills dipped in ammonium molybdate, dried and calcined | 64 |
| Do | 90 | vanadium pentoxide | 10 | alumina pills dipped in ammonium metavanadate, dried and calcined | 63 |
| bauxite pebbles | | | | | 69 |
| no catalyst | | | | | 0 |

1 This catalyst is 10 percent tungsten expressed as tungsten trioxide.

The pilled catalysts were all one-eighth inch with the exception of the alumina-titania catalyst which was seven thirty-seconds inch. It will be noted that no detectable amount of thioacetic acid was formed when no catalyst was employed.

Diacetyl sulfide was attained in yields considerably lower than those of thioacetic acid.

Example V

Two runs were made using activated charcoal as the catalyst but otherwise carried out in the same manner as in Example I and in the same equipment except that the temperature in the catalyst chamber was maintained at 122° F. in one run and at 212° F. in the other run. A yield of 37.2 per cent of theory, of thioacetic acid, based on ketene was obtained at 122° F. while a yield of only 17.6 per cent of theory was obtained at 212° F.

Example VI

Ketene prepared from dry acetone in accordance with the procedure of Example I was admixed with hydrogen sulfide and continuously passed through a reaction zone containing 200 cc. of pelleted bauxite catalyst maintained at a temperature of 172° F. Ketene was fed at a rate of 0.71 mole per hour and the hydrogen sulfide feed rate was 0.35 mole per hour. After 7.5 hours of operation, the reaction was terminated, providing a total yield of 189 grams of crude product. In the fractionation of the crude product, 107 grams of a diacetyl sulfide-rich fraction boiling in the range of 122-134° F. under a pressure of approximately 20 mm. was obtained. 74 grams of an overhead fraction boiling below 104° F. at 20 mm. and comprising principally thioacetic acid, was obtained.

I am not certain as to the mechanism by which the reaction of ketene with hydrogen sulfide takes place in the process of my invention. However, it is apparent that when employing relatively low mole ratios of hydrogen sulfide to ketene, discussed hereinabove, a major proportion of the hydrogen sulfide reacts with an equimolar proportion of ketene to form thioacetic acid, and the thioacetic acid thus formed, then reacts with ketene, present in excess, to form diacetyl sulfide.

As will be evident to those skilled in the art, various modifications of this invention can be made, or followed, in the light of the foregoing disclosure and discussion, without departing from the spirit or scope of the disclosure or from the scope of the claims.

I claim:

1. A process for the production of thioacetic acid and diacetyl sulfide, comprising passing hydrogen sulfide and ketene in a mole ratio of hydrogen sulfide to ketene within the limits of 0.2:1 to 8:1 into contact with an alumina-containing catalyst maintained at a temperature within the limits of 50 to 400° F. and in the presence of said catalyst reacting hydrogen sulfide with ketene each in vapor phase, and recovering thioacetic acid and diacetyl sulfide from the resulting reaction product.

2. A process for the production of thioacetic acid and diacetyl sulfide comprising passing hydrogen sulfide and ketene in a mole ratio of hydrogen sulfide to ketene within the limits of 0.2:1 to 8:1 into contact with activated charcoal as a catlyst maintained at a temperature within the limits of 50 to 400° F. and in the presence of said catalyst reacting hydrogen sulfide with ketene each in vapor phase, and recovering thioacetic acid and diacetyl sulfide from the resulting reaction product.

3. A process for the production of thioacetic acid and diacetyl sulfide comprising reacting hydrogen sulfide and ketene each in vapor phase in the presence of a solid adsorbent contact catalyst at a temperature within the range of 50–400° F. with a mole ratio of hydrogen sulfide to ketene within the limits of 0.2:1 to 8:1, and recovering thioacetic acid and diacetyl sulfide from the resulting reaction product.

4. A process for the production of thioacetic acid, comprising introducing hydrogen sulfide and ketene in a mole ratio of hydrogen sulfide to ketene within the limits of 2:1 to 5:1 to a reaction zone containing an alumina catalyst and therein reacting hydrogen sulfide with ketene each in the vapor phase at a temperature within the limits of 150 to 350° F., recovering thioacetic acid as a product of the process.

5. A process for the production of diacetyl sulfide, comprising introducing hydrogen sulfide and ketene in a mole ratio of hydrogen sulfide to ketene within the limits of 0.2:1 to 2:1 to a reaction zone containing an alumina catalyst and therein reacting hydrogen sulfide with ketene each in the vapor phase at a temperature within the limits of 150 to 350° F., and recovering diacetyl sulfide as a product of the process.

6. A process for the production of thioacetic acid comprising introducing hydrogen sulfide and ketene in a mole ratio of hydrogen sulfide to ketene within the limits of 2:1 to 5:1 to a reaction zone containing activated charcoal as a catalyst and therein reacting hydrogen sulfide with ketene each in the vapor phase at a temperature within the limits of 150 to 350° F., and recovering thioacetic acid as a product of the process.

7. A process for the production of thioacetic acid comprising introducing hydrogen sulfide and ketene in a mole ratio of hydrogen sulfide to ketene within the limits of 2:1 to 5:1 to a reaction zone containing a solid adsorbent contact catalyst and therein reacting hydrogen sulfide with ketene each in the vapor phase at a temperature within the limits of 150 to 350° F. and recovering thioacetic acid as a product of the process.

8. A process for the production of diacetyl sulfide comprising introducing hydrogen sulfide and ketene in a mole ratio of hydrogen sulfide to ketene within the limits of 0.2:1 to 2:1 to a reaction zone containing activated charcoal as a catalyst and therein reacting hydrogen sulfide with ketene each in the vapor phase at a temperature within the limits of 150 to 350° F., and recovering diacetyl sulfide as a product of the process.

9. A process for the production of diacetyl sulfide comprising introducing hydrogen sulfide and ketene in a mole ratio of hydrogen sulfide to ketene within the limits of 0.2:1 to 2:1 to a reaction zone containing a solid adsorbent contact catalyst and therein reacting hydrogen sulfide with ketene each in the vapor phase at a temperature within the limits of 150 to 350° F., and recovering diacetyl sulfide as a product of the process.

10. A process for the production of diacetyl sulfide, comprising reacting ketene with thioacetic acid in vapor phase in the presence of a solid adsorbent catalyst at a temperature within the range of 150–350° F., and recovering diacetyl sulfide from the resulting reaction product.

11. A process for the production of thioacetic acid and diacetyl sulfide, comprising passing hydrogen sulfide and ketene each in the vapor phase and in a mol ratio of hydrogen sulfide to ketene within the limits of 0.2:1 to 8:1 into contact with a solid adsorbent contact catalyst selected from the group consisting of an alumina, charcoal, and molybdenum sulfide, at a temperature within the limits of 50 to 400° F., whereby thioacetic acid and diacetyl sulfide are formed by the vapor phase reaction of hydrogen sulfide and ketene, and recovering thioacetic acid and diacetyl sulfide as products of the process.

12. The process of claim 11 wherein said catalyst comprises alumina.

13. The process of claim 12 wherein said catalyst is molybdena-alumina.

WILLIE W. CROUCH.

References Cited in the file of this patent

UNITED STATES PATENTS

| Number | Name | Date |
| --- | --- | --- |
| 2,412,036 | Ellingboe | Dec. 3, 1946 |

OTHER REFERENCES

Hurd et al., J. A. C. S., vol. 54, pp. 3427–3429 (1932).

Clarke and Hartman, J. A. C. S., vol. 46, pp. 1731–1733 (1924).

Hurd et al., J. A. C. S., vol. 58, pp. 962–968 (1936).

Chick et al., Chem. Zentr., 1908, part II, pp. 1018.